United States Patent
Li et al.

(10) Patent No.: US 10,458,320 B2
(45) Date of Patent: Oct. 29, 2019

(54) TURBOCHARGER WASTEGATE ACTUATOR ASSEMBLY

(71) Applicant: GM GLOBAL TECHNOLOGY OPERATIONS LLC, Detroit, MI (US)

(72) Inventors: Zhe Li, Rochester, MI (US); Julie A. Swartz, Commerce Township, MI (US); Grant W. Brady, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/807,993

(22) Filed: Nov. 9, 2017

(65) Prior Publication Data

US 2019/0136753 A1   May 9, 2019

(51) Int. Cl.
| | | |
|---|---|---|
| *F02B 37/18* | (2006.01) | |
| *F02B 39/14* | (2006.01) | |
| *F02B 47/08* | (2006.01) | |
| *F01D 17/14* | (2006.01) | |
| *F16K 5/06* | (2006.01) | |
| *F02C 6/12* | (2006.01) | |

(52) U.S. Cl.
CPC .......... *F02B 37/186* (2013.01); *F01D 17/141* (2013.01); *F02B 39/14* (2013.01); *F02B 47/08* (2013.01); *F02C 6/12* (2013.01); *F05D 2220/40* (2013.01); *F05D 2260/52* (2013.01); *F05D 2260/75* (2013.01); *F16K 5/0657* (2013.01)

(58) Field of Classification Search
CPC ...... F02B 37/18; F02B 37/183; F02B 37/186; F02B 39/14; F02B 47/08; F01D 17/105; F01D 17/141; F02C 6/12; F16K 5/0647; F05D 2220/40; F05D 2260/52; F05D 2260/57
See application file for complete search history.

(56) References Cited

U.S. PATENT DOCUMENTS

| | | | |
|---|---|---|---|
| 8,701,408 B2* | 4/2014 | Dettmann | F01D 17/105 415/157 |
| 9,562,468 B2* | 2/2017 | Werstat | F01D 17/105 |
| 2005/0050888 A1* | 3/2005 | McEwan | F01D 17/105 60/602 |
| 2007/0271917 A1* | 11/2007 | Vogt | F02B 37/183 60/600 |

(Continued)

FOREIGN PATENT DOCUMENTS

WO    2013015985 A1    1/2013

*Primary Examiner* — Igor Kershteyn
(74) *Attorney, Agent, or Firm* — Cantor Colburn LLP

(57) ABSTRACT

A wastegate actuator assembly includes a regulating rod, an arm, and a shaft. The regulating rod includes a proximate end region and a distal end region wherein the proximate end region of the regulating rod may be connected to an actuator. The arm includes a first end region and a second end region. The first end region is pivotally coupled to the distal end region of the regulating rod via a crank pin, a first cup spring, and a second cup spring wherein the first and second cup springs retain a solid lubricant substantially around the crank pin. The regulating rod may move in a linear fashion causing the arm and the shaft to rotate so as to move a wastegate cover connected to the shaft from a closed wastegate duct position (toward the wastegate duct) to an open wastegate duct position (away from the wastegate duct).

14 Claims, 4 Drawing Sheets

(56) References Cited

U.S. PATENT DOCUMENTS

| | | | |
|---|---|---|---|
| 2011/0099999 A1* | 5/2011 | Natali | F15B 15/10 |
| | | | 60/602 |
| 2013/0255250 A1* | 10/2013 | Naunheim | F01D 17/105 |
| | | | 60/602 |
| 2014/0140831 A1* | 5/2014 | Tschirschke | F02B 37/00 |
| | | | 415/182.1 |
| 2014/0348643 A1* | 11/2014 | House | F02B 37/186 |
| | | | 415/170.1 |
| 2016/0084163 A1* | 3/2016 | Swartz | F02B 37/186 |
| | | | 60/605.1 |
| 2017/0058762 A1 | 3/2017 | Marques et al. | |
| 2018/0347452 A1* | 12/2018 | Brady | F02B 37/186 |

* cited by examiner

TURBOCHARGER WASTEGATE ACTUATOR ASSEMBLY

TECHNICAL FIELD

The present disclosure relates generally to vehicle engines, and in particular, a turbocharger wastegate actuator assembly.

BACKGROUND

"Charging" devices are used in combustion engines, in order to increase the engine specific power output, which is directly proportional to the rate of air flow. In addition to the dynamic boost that utilizes the dynamics of the air drawn in, in some cases a mechanical charging design are used, where the Supercharging device is driven directly by the engine. In other charging device designs, Turbochargers typically include a compressor wheel to boost air that is drawn into the engine and a turbine wheel which is driven by the engine exhaust. In turbocharger designs, due to exhaust temperatures as high as 1050 degrees Celcius, associated components need to withstand temperatures which may exceed 500 degrees Celsius. Where a exhaust turbine drives a compressor for boosting inlet pressure to an internal combustion engine (e.g., as in a turbocharger), a wastegate at the turbine wheel housing provides a means to control the boost pressure. The turbine wastegate allows some exhaust to bypass the turbine and transfer such exhaust to the atmosphere.

An internal wastegate may be integrated at least partially into a turbine housing. An internal wastegate typically includes a flapper valve (e.g., a plug), a crank arm, a shaft or rod, and an actuator. A plug of a wastegate often includes a flat disk shaped surface that may seat against a flat seat (e.g., a valve seat or wastegate seat) disposed about an exhaust bypass opening defined in the turbine wheel housing. However, though various plug designs may include a protruding portion that extends into an exhaust bypass opening (e.g., past a plane of a wastegate seat).

In a closed wastegate duct position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Accordingly, a need has developed to provide a wastegate actuator assembly which may withstand the high exhaust temperatures and the high exhaust pulsation levels over an extended period of time.

SUMMARY

The present disclosure provides a wastegate actuator assembly having a regulating rod, an arm, and a shaft. The regulating rod includes a proximate end region and a distal end region wherein the proximate end region of the regulating rod may be connected to an actuator. The arm includes a first end region and a second end region. The first end region is pivotally coupled to the distal end region of the regulating rod via a crank pin, a first cup spring and a second cup spring retaining a solid lubricant substantially around the crank pin. The shaft having a shaft axis may be rotationally fixed to the second end region of the arm. The regulating rod may move in a linear fashion relative to the actuator causing the arm and the shaft to rotate about the shaft axis so as to move a wastegate cover connected to the shaft toward and away from the duct 22.

The crank pin, the first and second cup springs and the arm may define a chamber configured to retain the solid lubricant. It is understood that the chamber may be substantially closed or completely closed in order to keep the solid lubricant in place at the joint. The crank pin may be integral to the first end region of the arm at a base of the crank pin. The crank pin may be disposed in an aperture defined in the regulating rod with the first cup spring disposed around an upper region of the crank pin adjacent to an upper outer surface of the regulating rod while the second cup spring is disposed around a lower region of the crank pin adjacent to a lower outer surface of the regulating rod.

In yet another embodiment of the present disclosure, an improved turbocharger having a robust actuator assembly is provided. The turbocharger includes a turbocharger housing, compressor and turbine wheels connected via a rotor shaft, an actuator, a regulating rod, an arm and a wastegate cover. As shown in FIG. 1, the turbocharger housing defining a wastegate duct 22. Moreover, the compressor wheel, the turbine wheel and the rotor shaft are disposed within the turbine housing. The actuator may be affixed to the turbocharger housing and the regulating rod, having a proximate end region and a distal end region, is connected to the actuator at the proximate end region. The arm includes a first end region and a second end region wherein the first end region may be pivotally coupled to the distal end region of the regulating rod via a crank pin, a first cup spring and a second cup spring retaining a solid lubricant substantially around the crank pin. The shaft may be configured to rotate about a shaft axis disposed in the turbine housing and rotationally fixed to the second end region of the arm such that the shaft and the second end region of the arm rotate together about the shaft axis.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
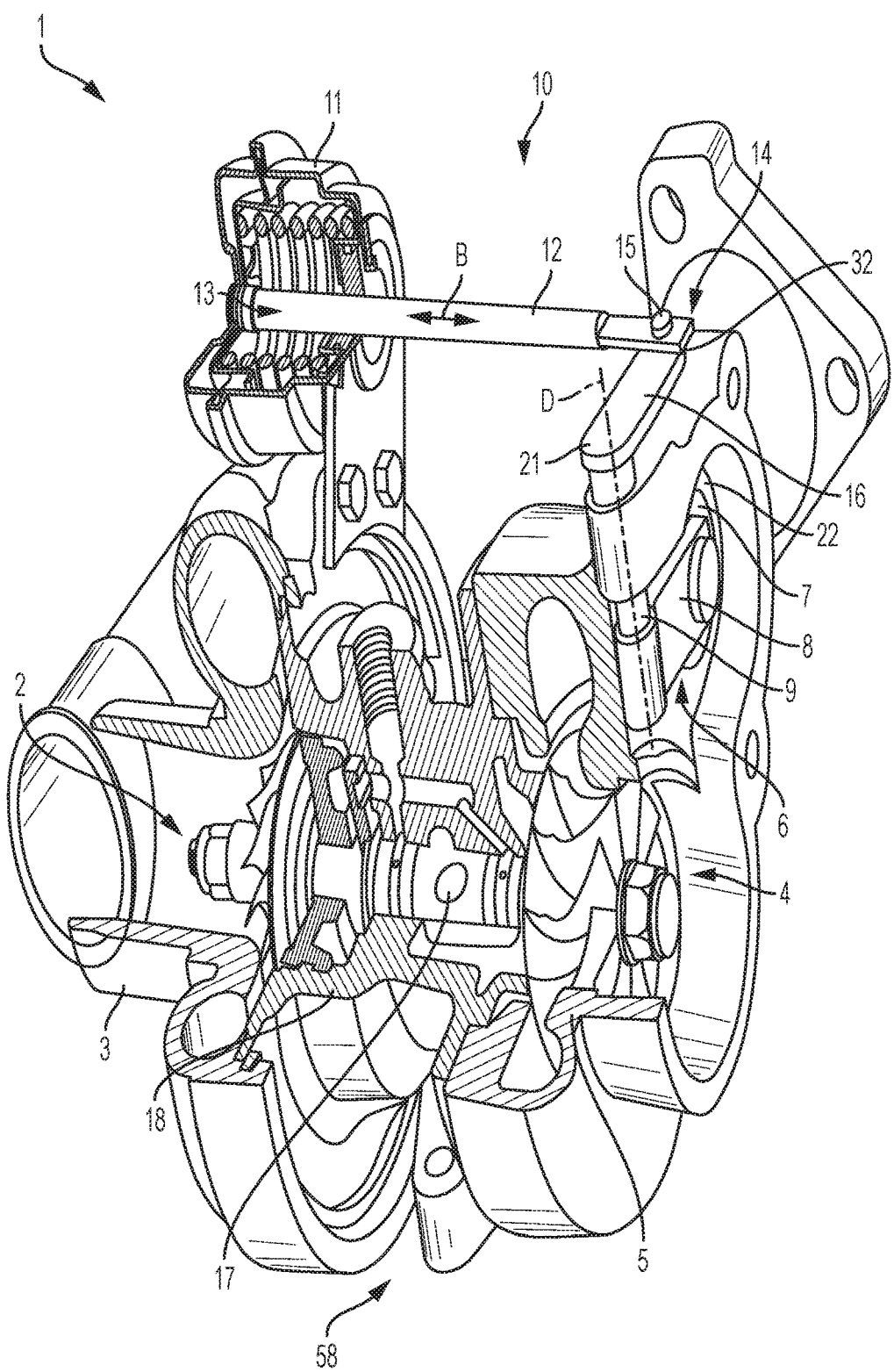
FIG. 1 illustrates a turbocharger having an actuation assembly in accordance with the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

With reference to FIG. 1, a perspective illustration of an example exhaust-gas turbocharger 1 of the present disclosure is provided. The turbocharger 1 includes a compressor wheel 2 and a compressor housing 3 and a turbine wheel 4 in a turbine housing 5. The turbine housing region 5 and the compressor housing region 3 form part of the overall turbocharger housing. The turbine housing region 5 and the compressor housing region 3 are connected to one another in the conventional way by means of a bearing housing region 18 in which is mounted a rotor shaft 17 which, at its two free ends, bears the compressor wheel 2 and the turbine wheel 4 respectively.

In the turbine housing 5, a wastegate cover arrangement 6 (formed by wastegate lever 8, cover 7, and shaft 9) is provided for opening and closing a wastegate duct 22, which is not visible owing to the illustration selected in FIG. 1. The wastegate cover arrangement 6 is biased to close off the wastegate duct 22 with the cover 7 via the actuator 11. While the example actuator 11 of FIG. 1 is shown as a pneumatic actuator, it is understood that actuator 11 may also be an electric actuator. However, as the boost pressure exceeds a predetermined value, the actuator 11 causes the cover 7 to open via the actuator assembly 10. The opening of the wastegate duct 22 (by moving cover 7 away from the wastegate duct 22) allows exhaust gases to bypass the turbine wheel thereby regulating the speed of the turbine wheel.

The wastegate cover arrangement 6 includes a cover 7 which is mounted on a wastegate lever 8. The wastegate lever 8 is provided with (or affixed to) a shaft 9 which is guided out of the turbine housing 5 and which is connected at its end, the top end in the example, to an arm 16 of an actuator assembly 10. The arm 16 of the actuator assembly 10 is pivotally connected via a crank pin 15 to a regulating rod 12.

Figure 3:
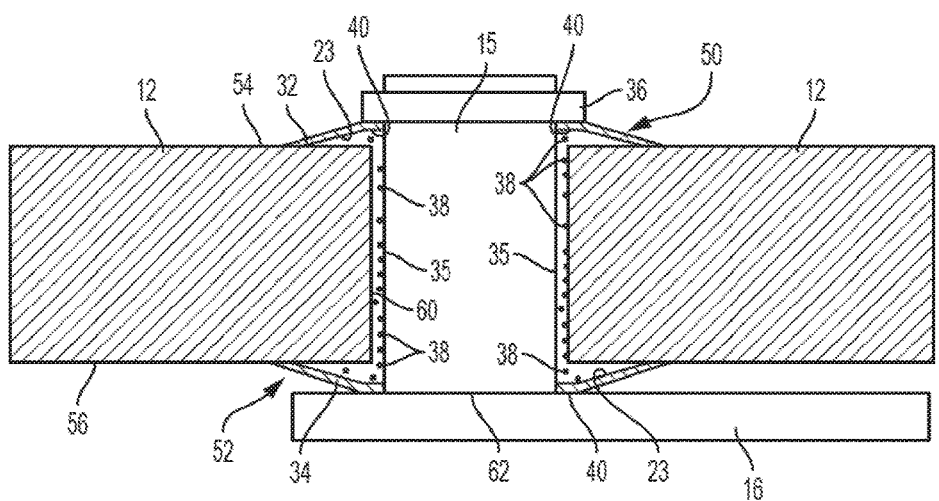
FIG. 3 illustrates a cross-sectional view along line 3-3 in FIG. 1.

Thus, at its proximate end region 13, the regulating rod 12 is connected to an actuator 11, and at the distal end region 14, the regulating rod 12 is connected via the crank pin 15 to the arm 16. As a result of said arrangement, the linear movement B of the regulating rod 12 is converted by means of the actuating force transmitting device into a rotational movement of the arm 16 and therefore a rotational movement of the shaft 9 about an axis of rotation D, such that the cover 7 can be pivoted away from the wastegate duct 22 and can be pivoted toward the latter in order to dose it. As noted, the aforementioned actuator assembly 10 may be subject to high temperatures which may exceed 500 degrees Celsius as well as subjected to high mechanical loading from engine combustion pulses on the wastegate valve face and from engine global inertial reactions to combustion events. The actuation assembly 10 of the present disclosure is therefore configured to retain a dry lubricant 38 which does not break down under the aforementioned severe operating conditions thereby increasing the life of the assembly 10. With respect to all embodiments in the present disclosure, solid lubricant 38 may be applied to the joint between the arm 16 and the regulating rod 12 as coating on the pin outer diameter or the regulating rod inner diameter, but upon use, solid lubricant 38 may break up and disperse within chamber 23 as shown in FIG. 3. Some of the solid lubricant 38 may remain bonded to the crank pin 15 and regulating rod aperture surfaces, but a significant amount of the solid lubricant 38 will be in a flaked powder form within chamber 23 shortly after start of use.

Figure 2:
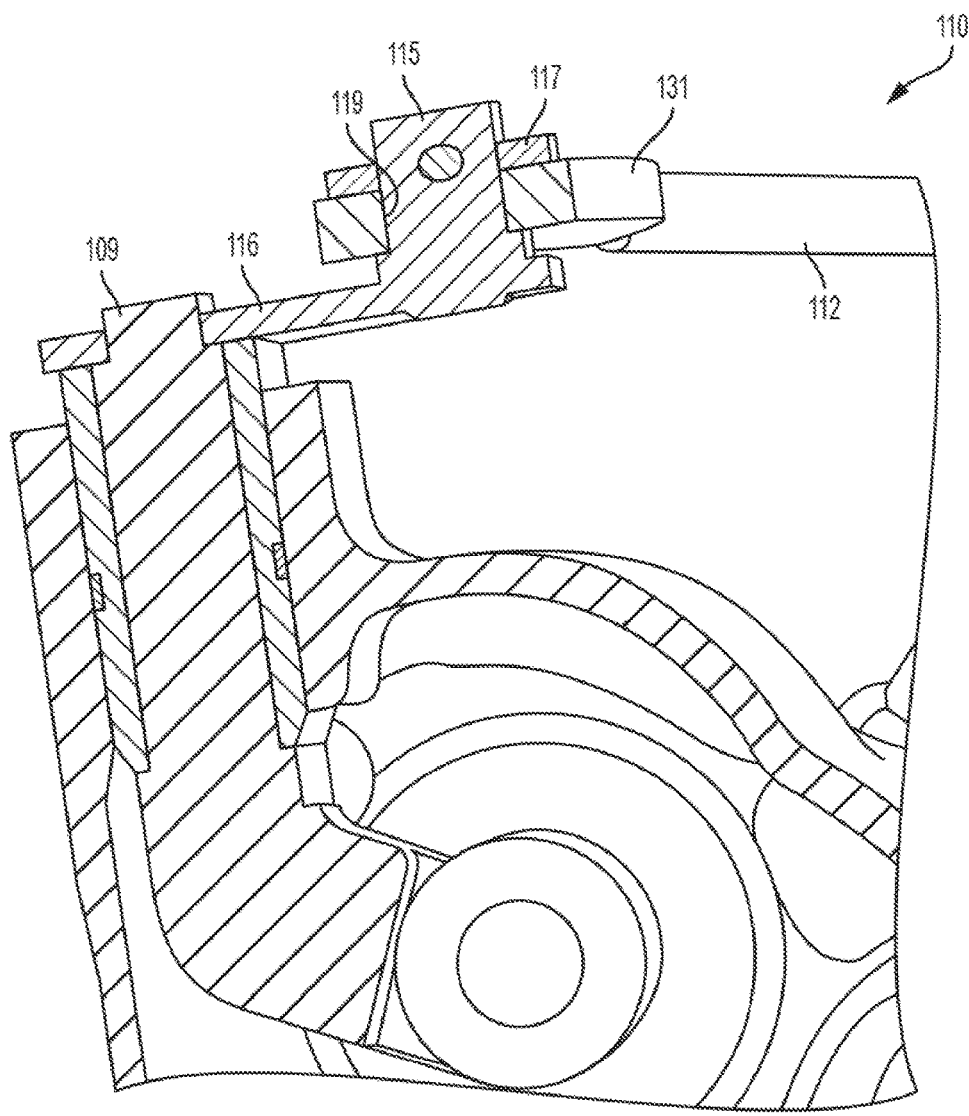
FIG. 2 illustrates a cross-sectional view of an example traditional actuation assembly.

With reference to FIG. 2, an example traditional wastegate actuator assembly 110 is shown where the arm 116 and the regulating rod 131 are pivotally coupled with crankpin 115. As shown, a snap ring 117 maintains the crank pin 115 of the arm 116 within the aperture of the regulating rod 112. A wet lubricant is implemented where the crankpin 115 meets the aperture 119 of the regulating rod 112. However, the wet lubricant (not shown) can quickly degrade and break down under such high operating temperatures and high pulse levels.

Accordingly, the present disclosure further provides a wastegate actuator assembly 10 having a robust lubricated joint between the regulating rod 12 and the arm 16 as shown in FIGS. 1 and 3. The wastegate actuator assembly 10 of the present disclosure is able to retain or house a solid lubricant 38 at the joint between the arm 16 and the regulating rod 12 despite high operating temperatures and high pulse levels thereby increasing the life of the actuator assembly. Thus, as noted, the wastegate actuator assembly 10 includes, but is not limited to, a regulating rod 12, an arm 16, and a shaft 9. The regulating rod 12 includes a proximate end region 13 and a distal end region 14 wherein the proximate end region 13 of the regulating rod 12 may be connected to an actuator 11. The arm 16 includes a first end region 19 and a second end region 21. The first end region 19 is pivotally coupled to the distal end region 14 of the regulating rod 12 via a crank pin 15, a first cup spring 32, and a second cup spring 34 wherein the first and second cup springs 32, 34 retain a solid lubricant 38 substantially around the crank pin 15 in a chamber 23. The shaft 9, having a shaft axis D, may be rotationally fixed to the second end region 21 of the arm 16. Thus, as described above, the regulating rod 12 may move in a linear fashion B (see FIG. 1) relative to the actuator 11 causing the arm 16 and the shaft 9 to rotate about the shaft axis D so as to move a wastegate cover 7 connected to the shaft 9 toward and away from a wastegate duct.

As shown in FIG. 3, the crank pin 15, the first and second cup springs 32, 34 and the arm 16 define a chamber 23 configured to retain the solid lubricant. It is understood that the chamber 23 may be substantially closed or completely closed in order to keep the solid lubricant 38 in place at the joint between the arm 16 and the regulating rod 12. The crank pin 15 may be integral to the first end region 19 of the arm 16 at a base 62 of the crank pin 15 such that the crank pin 15 may be welded or otherwise permanently affixed to the first end region 19 of the arm 16 at the base 62 of the crank pin 15, or the crank pin 15 and the arm 16 may be formed from one piece of material.

With reference to FIGS. 1 and 3, the crank pin 15 may be disposed in an aperture 60 (FIG. 3) defined in the regulating rod 12 with the first cup spring 32 disposed around an upper region 50 (FIG. 3) of the crank pin 15 adjacent to an upper outer surface 54 54 of the regulating rod 12 while the second cup spring 34 is disposed around a lower region 52 (FIG. 3) of the crank pin 15 adjacent to a lower outer surface 56 56 of the regulating rod 12. It is understood that the solid lubricant 38 shown in FIG. 3 is configured to withstand operating temperatures in excess of 500 degrees Celsius. Therefore, the actuator assembly 10 experiences reduced wear and tear given that the solid lubricant 38 will not breakdown under the high temperatures and high pulse levels.

Figure 4A:
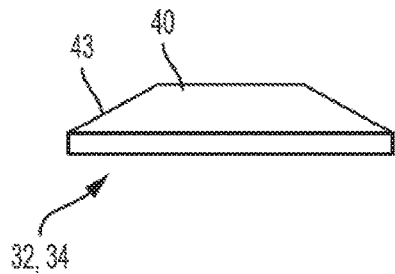
FIG. 4A illustrates a side view of a cup spring (or spring washer) used in FIGS. 1 and 3.
Figure 4B:
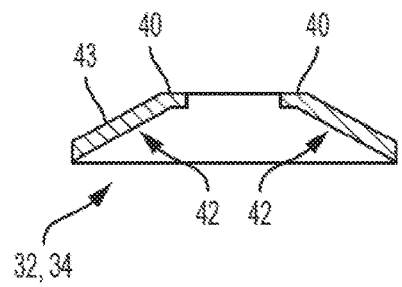
FIG. 4B illustrates a cross-section view of the cup spring in FIG. 5 along line 4B-4B.
Figure 5:
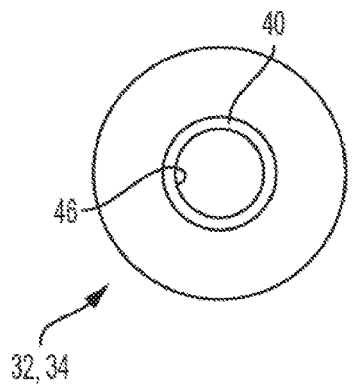
FIG. 5 illustrates a plan view of the cup spring of FIGS. 4A and 4B.

With reference to FIGS. 4A-4B and 5, an example, non-limiting cup spring 32, 34 is shown. The first and second cup springs 32, 34 may have a somewhat resilient structure which may withstand some expansion and contraction in the joint between the regulating rod 12 and the arm 16. It is also understood that the first and second cup springs may also be referred to as spring washers or the like. While not required, the first and second cup springs 32, 34 in all embodiments of the present disclosure may include an upper horizontal surface 40 which may abut an adjacent component—that is, snap clip 36 for first cup spring 32, and arm 16 for second cup spring as shown in FIG. 3.

It is understood that the arm 16, regulating rod 12, and the first and second cup springs 32, 34 are pre-loaded in compression when the snap clip 36 is attached to the crankpin 15. Each of the first and second cup springs 32, 34 may each opening 46 configured to receive the crank pin 15. Moreover, each of the first and second cup springs may include an open chamber 42 (FIG. 4B) defined by wall 43 when the wall 43 is disposed at an angle as shown in FIGS. 4A and 4B. When the first and second cup springs are assembled onto the crank pin 15 and regulating rod 15, the open chamber 42 may further retain solid lubricant 38 as shown in FIG. 3. It is further understood that the cup spring chamber 42 of the first cup spring 32 may be in fluid communication with cup spring chamber 42 of the second cup spring 34 via the gap 35 between the crank pin 15 and the aperture 60. Regardless of the angle of the wall 43, it is understood that the chamber 23 (which retains the solid lubricant 38) is defined by the first and second cup springs 32, 34, the crank pin 15, and the regulating rod 12 as shown in FIG. 3.

In yet another embodiment of the present disclosure, an improved turbocharger 1 having a robust actuator assembly 10 is provided. The turbocharger 1 includes a turbocharger housing 58, compressor and turbine wheels 2, 4 connected via a rotor shaft 9, an actuator 11, a regulating rod 12, an arm 16 and a wastegate cover 7. As shown in FIG. 1, the turbocharger housing defining a wastegate duct 22. Moreover, the compressor wheel 2, the turbine wheel 4 and the rotor shaft 9 are disposed within the turbine housing 58. The actuator 11 may be affixed to the turbocharger housing and the regulating rod 12, having a proximate end region 13 and a distal end region 14, is connected to the actuator 11 at the proximate end region 13. The arm 16 includes a first end region 19 and a second end region 21 wherein the first end region 19 may be pivotally coupled to the distal end region 14 of the regulating rod 12 via a crank pin 15, a first cup spring 32 and a second cup spring 34 retaining a solid lubricant 38 substantially around the crank pin 15. The shaft 9 may be configured to rotate about a shaft axis D disposed in the turbocharger housing 58 and rotationally fixed to the second end region 21 of the arm 16 such that the shaft 9 and the second end region 21 of the arm 16 rotate together about the shaft axis D. It is understood that under this arrangement, the regulating rod 12 is configured to move in a linear fashion B relative to the actuator 11 causing the arm 16 and the shaft 9 to rotate about the shaft axis D proximate to the second end region 21 of the arm 16 so as to move a wastegate cover 7 connected to the shaft 9 toward and away from the wastegate duct 22.

With reference to FIG. 3, the crank pin 15, the first and second cup springs 32, 34 and the arm 16 define a chamber 23 configured to retain the solid lubricant. It is understood that the chamber 23 may be substantially closed (due to any space between the cup springs 32, 34 and the regulating rod 12, or completely closed (as shown in FIG. 3 such that the cup springs 32, 34 abut regulating rod 12) in order to keep the solid lubricant 38 in place at the joint. With reference again to FIG. 3, the crank pin 15 may be integral to the first end region 19 of the arm 16 at a base 62 of the crank pin 15. The crank pin 15 may be welded to the first end region 19 of the arm 16 at the base 62 of the crank pin 15, or the crank pin 15 and the arm 16 may be formed from one piece of material.

As shown in FIGS. 1 and 3, the crank pin 15 may be disposed in an aperture defined in the regulating rod 12 with the first cup spring 32 disposed around an upper region 50 (FIG. 3) of the crank pin 15 adjacent to an upper outer surface 54 of the regulating rod 12 while the second cup spring 34 is disposed around a lower region 52 (FIG. 3) of the crank pin 15 adjacent to a lower outer surface 56 of the regulating rod 12. It is understood that the solid lubricant 38 shown in FIG. 3 is configured to withstand operating temperatures in excess of 500 degrees Celsius. Therefore, the actuator assembly 10 is subject to decreased wear and tear given that the solid lubricant 38 will not breakdown under the high temperatures and high pulse levels.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A wastegate actuator assembly comprising:
    a regulating rod having a proximate end region and a distal end region, the proximate end region of the regulating rod being connected to an actuator; and
    an arm having a first end region and a second end region, the first end region being pivotally coupled to the distal end region of the regulating rod via a crank pin, a first cup spring and a second cup spring retaining a solid lubricant substantially around the crank pin; and
    a shaft configured to rotate about a shaft axis disposed in a turbine housing and rotationally fixed to the second end region of the arm;
    wherein the regulating rod is configured to move in a linear fashion relative to the actuator causing the arm and the shaft to rotate about the shaft axis proximate to the second end region of the arm so as to move a wastegate cover connected to the shaft toward and away from a wastegate duct.

2. The wastegate actuator assembly as defined in claim 1 wherein the crank pin, the first and second cup springs and the arm define a chamber configured to retain the solid lubricant.

3. The wastegate actuator assembly as defined in claim 2 wherein the chamber is substantially closed.

4. The wastegate actuator assembly as defined in claim 2 wherein the chamber is completely closed.

5. The wastegate actuator assembly as defined in claim 2 wherein the crank pin is integral to the first end region of the arm at a base of the crank pin and the crank pin is disposed in an aperture defined in the regulating rod with the first cup spring disposed around an upper region of the crank pin adjacent to an upper outer surface of the regulating rod and the second cup spring is disposed around a lower region of the crank pin adjacent to a lower outer surface of the regulating rod.

6. The wastegate actuator assembly as defined in claim 5 wherein the crank pin is welded to the first end region of the arm at a base of the crank pin.

7. The wastegate actuator assembly as defined in claim 5 wherein the solid lubricant is configured to withstand operating temperatures in excess of 500 degrees Celsius.

8. A turbocharger comprising:
    a turbocharger housing defining a wastegate duct;
    a compressor wheel axially connected to a turbine wheel via a rotor shaft, the compressor wheel, the turbine wheel and the rotor shaft being disposed within the turbine housing;
    an actuator affixed to the turbocharger housing;
    a regulating rod having a proximate end region and a distal end region, the proximate end region of the regulating rod being connected to the actuator; and
    an arm having a first end region and a second end region, the first end region being pivotally coupled to the distal end region of the regulating rod via a crank pin, a first cup spring and a second cup spring retaining a solid lubricant substantially around the crank pin; and
    a shaft configured to rotate about a shaft axis disposed in the turbine housing and rotationally fixed to the second end region of the arm;
    wherein the regulating rod is configured to move in a linear fashion relative to the actuator causing the arm and the shaft to rotate about the shaft axis proximate to the second end region of the arm so as to move a wastegate cover connected to the shaft toward and away from the wastegate duct.

9. The turbocharger as defined in claim 8 wherein the crank pin, the first and second cup springs and the arm define a chamber configured to retain the solid lubricant.

10. The turbocharger as defined in claim 9 wherein the chamber is substantially closed.

11. The turbocharger as defined in claim 9 wherein the chamber is completely closed.

12. The turbocharger as defined in claim 9 wherein the crank pin is integral to the first end region of the arm at a base of the crank pin and the crank pin is disposed in an aperture defined in the regulating rod with the first cup spring disposed around an upper region of the crank pin adjacent to an upper outer surface of the regulating rod and the second cup spring is disposed around a lower region of the crank pin adjacent to a lower outer surface of the regulating rod.

13. The turbocharger as defined in claim 12 wherein the crank pin is welded to the first end region of the arm at a base of the crank pin.

14. The turbocharger as defined in claim 12 wherein the solid lubricant is configured to withstand operating temperatures in excess of 500 degrees Celsius.

* * * * *